B. KREISCHER.

Hollow-Tile Flooring.

No. 5,174. Reissued Dec. 3, 1872.

Witnesses.
Chas. Wahlers.
Ernst Bilhuber.

Inventor.
Balthasar Kreischer
p.
Van Santvoord & Hauff
Attys

THE NORRIS PETERS CO., PHOTO-LITHO., WASHINGTON, D. C.

UNITED STATES PATENT OFFICE.

BALTHASAR KREISCHER, OF NEW YORK, N. Y.

IMPROVEMENT IN HOLLOW TILE FLOORINGS.

Specification forming part of Letters Patent No. 112,930, dated March 21, 1871; reissue No. 5,174, dated December 3, 1872.

*To all whom it may concern:*

Be it known that I, BALTHASAR KREISCHER, of the city, county, and State of New York, have invented a new and useful Improvement in Hollow Tiles; and I do hereby declare the following to be a full, clear, and exact description thereof, which will enable those skilled in the art to make and use the same, reference being had to the accompanying drawing forming part of this specification, in which drawing—

Figure 1:
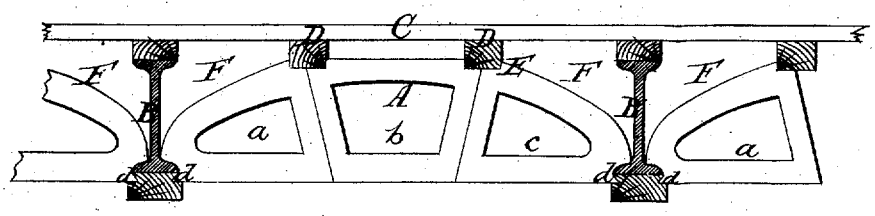
Figure 2:
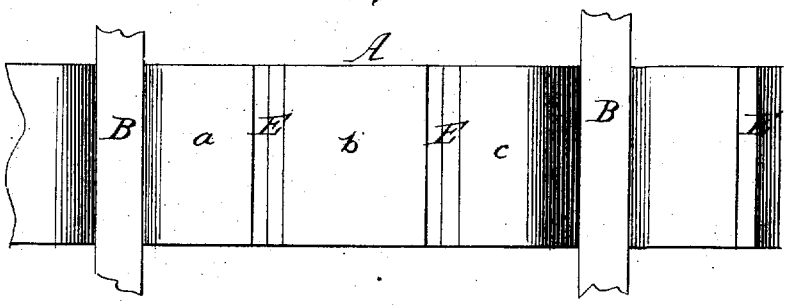

Figure 1 represents a transverse section of my invention, and Fig. 2 is a plan or top view of the same.

Similar letters indicate corresponding parts.

This invention consists in a hollow sectional tile combined with beams or girders of a building in such a manner that the combined tile spans the space between opposite beams or girders, the end sections being supported upon or against the opposite beams or girders and the middle section forming a key to bind the sections together, the whole tile having a flat under surface.

In the drawing I have represented such a tile, its combined sections forming an arch extending between the points of support, against which the end sections rest.

In Fig. 1 the letter A designates a hollow tile made in sections; *a b c*, the middle section, *b* forming the key for the end sections, which latter rest upon the girders B B.

This tile is intended particularly for ceilings, and I have provided its end sections with recesses *d* to catch over the bottom flanges of the iron girders B B between which the tile extends.

When the tile is made in one piece, as heretofore, and one of the girders settles down, the tile, being unable to accommodate itself to the change in the positions of the girders in relation to each other, is liable to crack, and my experience has shown that such hollow tiles are impracticable.

If the tile is made in sections, according to my invention, the sections can adjust themselves on each other; or, in other words, the combined tile is enabled to accommodate itself to any slight change in the relative positions of the girders toward each other, and is not liable to break.

The letter C designates a flooring above the ceiling, the floor resting on the girders B and on sleepers D D, which I prefer to place over the joints of the different sections of the tile where they are let into recesses or grooves E prepared for them when constructing the tile.

By sloping the end sections *a c* of the tile downward from their inner toward their outer ends, I am enabled to form air-spaces F F between the floor and the tile, which have the effect to preserve the sleepers D and the flooring C, both of which are usually made of wood.

In ordinary constructions, where brick arches span the intervals between the iron girders B B, the spaces between the arches and the flooring and along the sides of the sleepers D are filled up with cement or other filling material, thereby excluding air and preventing ventilation and subjecting the sleepers and the flooring to decay or dry-rot. But by means of the air-spaces F I secure ventilation to the sleepers and flooring, whereby the wood is preserved.

My invention has the great advantages of lightness and facility of construction and removal, the weight of an equal area of my sectional tile, as compared with the ordinary brick or cement filling, being about as one to four.

What I claim as new, and desire to secure by Letters Patent, is—

1. In combination with supporting beams or girders, a sectional hollow tile whose end sections abut against opposite beams or girders and whose middle section forms a key, and so constructed that the under side of the tile forms a flat surface, substantially as described.

2. A hollow tile made in sections, one of which forms a key for the end sections, which are provided with recesses *d* to catch over the flanges of the girders B, substantially as described.

BALTHASAR KREISCHER.

Witnesses:
W. HAUFF,
CHAS. WAHLERS.